(12) United States Patent
Nagao et al.

(10) Patent No.: US 10,378,581 B2
(45) Date of Patent: Aug. 13, 2019

(54) LINEAR MOTION GUIDE UNIT

(71) Applicant: NIPPON THOMPSON CO., LTD., Tokyo (JP)

(72) Inventors: Shoji Nagao, Kamakura (JP); Tomoyuki Hayashi, Kamakura (JP); Masahiro Miura, Tokyo (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 15/990,992

(22) Filed: May 29, 2018

(65) Prior Publication Data

US 2018/0347626 A1 Dec. 6, 2018

(51) Int. Cl.
| | |
|---|---|
| *F16C 29/06* | (2006.01) |
| *F16C 29/00* | (2006.01) |
| *F16C 17/24* | (2006.01) |
| *B23Q 1/40* | (2006.01) |
| *B23Q 1/01* | (2006.01) |

(52) U.S. Cl.
CPC .......... *F16C 29/005* (2013.01); *F16C 17/246* (2013.01); *F16C 29/065* (2013.01); *F16C 29/0607* (2013.01); *B23Q 1/017* (2013.01); *B23Q 1/40* (2013.01); *F16C 2370/00* (2013.01)

(58) Field of Classification Search
CPC ................................................. F16C 29/0607
See application file for complete search history.

(56) References Cited

U.S. PATENT DOCUMENTS

| | | | |
|---|---|---|---|
| 5,129,736 A * | 7/1992 | Tanaka | F16C 29/0607 384/44 |
| 7,066,650 B2 * | 6/2006 | Ishihara | F16C 29/0607 384/44 |
| 9,574,605 B2 * | 2/2017 | Ikegami | F16C 29/0607 |

FOREIGN PATENT DOCUMENTS

| | | |
|---|---|---|
| JP | 07-91446 A | 4/1995 |
| JP | 2014234858 A | 12/2014 |

* cited by examiner

*Primary Examiner* — Thomas R Hannon (57) ABSTRACT

In the linear motion guide unit, a retainer plate for retaining rolling elements, or rollers, is prevented from deformation so as to smoothly guide the rollers. The retainer plate is composed of a retainer member, frame members fitted into respective through holes formed in the retainer member, and a fixing member disposed in a longitudinally extending recess of the retainer member. The frame members form a predetermined gap between the fixing member and a carriage. Tightening forces of fastening bolts are not applied to the retainer member, thereby avoiding deformation of the retainer member.

6 Claims, 11 Drawing Sheets

LINEAR MOTION GUIDE UNIT

FIELD OF THE INVENTION

The present invention relates to a linear motion guide unit having retainer plates for retaining rollers rolling in load-carrying races, along raceway surfaces of a slider.

BACKGROUND OF THE INVENTION

In a conventionally known linear motion guide unit, retainer means for retaining cylindrical rollers is snap-on fixed to a slider to thereby increase the rated load of the slider. In the linear motion guide unit, a retainer plate is disposed between the cylindrical rollers disposed along an upper raceway surface of a carriage and the cylindrical rollers disposed along a lower raceway surface of the carriage. A holder portion of a fixing band is engaged with an engagement groove of the retainer plate and with engagement grooves of end caps. Engagement beaks at the ends of bend portions of the fixing band are engaged with respective engagement holes formed in the end caps. The retainer means for retaining the cylindrical rollers is incorporated in the slider and retains the cylindrical rollers to a load-carrying race formed by a guide rail and the carriage (see, for example, Japanese Patent Application Laid-Open No. H07-91446).

In another conventionally known linear motion guide unit, a retainer plate has a light structure and can be simply and easily held to end caps to thereby reduce the size of a slider. The linear motion guide unit is composed of a guide rail, and the slider moving on the guide rail via rollers. The slider has a carriage and end caps fixed to the respective opposite ends of the carriage. The rollers located on the raceway surface side of the carriage are retained to the carriage by the retainer plate. The retainer plate is fixed to the carriage by screwing fastening bolts inserted through respective insertion holes formed in the carriage into respective nuts disposed at the back of the retainer plate. The retainer plate is composed of a pair of flat plate portions formed by bending a thin plate along its longitudinal direction in such a manner as to have a V-shaped cross section. The pair of flat plate portions are formed to be greater in length than the carriage, and opposite end portions thereof are fixedly fitted into respective engagement grooves formed in the end caps. The flat plate portions guide the end surfaces of the rollers rolling on the upper and lower raceway surfaces of the carriage to thereby retain the rollers on the raceway surfaces. In order to hold the retainer plate to the slider, the carriage has the insertion holes formed therein, and the bolts are screwed into the respective nuts provided on the back of the retainer plate (see, for example, Japanese Patent Application Laid-Open No. 2014-234858 (FIG. 28)).

Meanwhile, a conventional large-sized roller-type linear motion guide unit has in some cases involved the following problem: in the case of fixing a retainer plate made of resin to a carriage by tightening fastening bolts with strong tightening torque, tightening forces (axial forces) of the bolts are applied directly to the retainer plate and cause deformation of the guide surfaces; as a result, for example, the guide surfaces swell to thereby narrow load-carrying races between a guide rail and the carriage, resulting in a failure to attain smooth circulation of rollers. Thus, there has been desired a structure free from deformation of the guide surfaces of the retainer plate even in attaching the retainer plate to the carriage by screwing the fastening bolts into the retainer plate.

For example, the linear motion guide unit shown in FIG. 15 and FIGS. 16(a) to 16(c) is a large-sized roller-type mass-produced product in which a retainer plate 7 is composed of a retainer member 12 made of resin and a fixing member 13 disposed on the back side of the retainer member 12 and formed of a long and narrow metal plate having the same length as that of the retainer member 12. The retainer member 12 has a recess 50 in which the fixing member 13 is disposed, and through holes 53 through which fastening bolts 41 are inserted. The fastening bolts 41 are screwed into respective female threads 42 provided in the fixing member 13 to thereby fix the retainer plate 7 to a carriage 3. However, since the retainer member 12 of the retainer plate 7 is held between the carriage 3 and the fixing member 13, tightening forces (axial forces) of the fastening bolts 41 are applied to the retainer member 12. Accordingly, if the fixing member 13 is fixed to the carriage 3 with strong tightening torque, guide surfaces 32 of the retainer member 12 swell or distort at a bolt position, resulting in a reduction of the dimension between the guide surfaces 32 of a load-carrying race. As a result, the amount of interference between the guide surface 32 and a roller end surface 25 increases; consequently, a roller 5 fails to smoothly pass, and sliding resistance increases. In the large-sized linear motion guide unit shown in Japanese Patent Application Laid-Open No. H07-91446 whose applicant is the same as the applicant of the present invention, the retainer plate made of resin is fixed to the carriage with the fixing band made of a metal. If the fixing band excessively presses the retainer plate toward the carriage, the following problem may arise: the retainer plate is deformed to thereby reduce the dimension between the guide surfaces of the load-carrying race; as a result, the guide surface of the retainer plate and the end surface of a roller interfere with each other; accordingly, the roller fails to smoothly pass, and sliding resistance increases. In the linear motion guide unit described in Japanese Patent Application Laid-Open No. 2014-234858 whose applicant is the same as the applicant of the present invention, the retainer plate is fixed to the carriage by screwing the bolts inserted through respective through holes formed in the carriage, into respective nuts disposed in a recess formed in the back of the retainer plate. Accordingly, a similar problem may arise as in the case of the above-mentioned large-sized roller-type linear motion guide unit.

SUMMARY OF THE INVENTION

The present invention has been conceived to solve the above problem, and an object of the present invention is to provide an improved linear motion guide unit which includes a retainer member adapted to retain rollers along load-carrying races and in which frame members made of a metal are disposed in the retainer member made of resin and constituting a retainer plate, and the retainer plate is fixed to a carriage via the frame members by tightening fastening bolts, whereby deformation of the retainer member constituting the retainer plate is prevented. Thus, in the improved linear motion guide unit, the rollers smoothly circulate while being guided by guide surfaces of the retainer member, and through prevention of occurrence of deformation of the retainer member, interference between end surfaces of the rollers and the guide surfaces of the retainer plate can be prevented so as to restrain variations in sliding resistance of the rollers rolling in the load-carrying races.

Means to Solve the Problems

The present invention provides a linear motion guide unit comprising a guide rail and a slider. The guide rail has first raceway surfaces extending in a longitudinal direction on respective opposite longitudinal sides. The slider straddles the guide rail, has second raceway surfaces facing the respective first raceway surfaces, and slides in relation to the guide rail via rolling elements serving as rollers and rolling in load-carrying races formed between the first raceway surfaces and the second raceway surfaces, respectively. The slider has a carriage, end caps, the rollers, and retainer plates. The carriage has the second raceway surfaces, and return passages extending in parallel with the second raceway surfaces. The end caps are disposed on respective longitudinally opposite end surfaces of the carriage and have turnaround passages formed therein for establishing communication between the load-carrying races and the return passages. The rollers roll in circulating circuits composed respectively of the load-carrying races, the return passages, and the turnaround passages. The retainer plates are disposed along the respective second raceway surfaces and adapted to retain the rollers to the slider.

Each of the retainer plates comprises a retainer member, a fixing member, and frame members. The retainer member extends in the longitudinal direction and has a pair of first guide surfaces for guiding one end surfaces of the rollers. The fixing member is made of a metal, disposed in a recess formed in the retainer member on a back side of the first guide surfaces and extending in the longitudinal direction, and adapted to fix the retainer member to the carriage. The frame members are made of a metal, disposed in first through holes extending through the retainer member and located at predetermined longitudinal positions, and adapted to form a predetermined gap between the fixing member and the carriage.

Each of the frame members has a second through hole formed therein and allowing insertion therethrough of a fastening bolt for fixing the fixing member to the carriage, and the fixing member has female threads formed at longitudinal intervals and threadingly engaged with the respective fastening bolts.

The fastening bolts are inserted through respective holes formed in the carriage and through the respective second through holes of the frame members and are threadingly engaged with the respective female threads of the fixing member so as to fasten the fixing member to the carriage. By this procedure, the frame members come into contact with the fixing member and with the carriage to thereby form the predetermined gap between the fixing member and the carriage, so that the retainer plate is fixed to the carriage in a state in which tightening forces of the fastening bolts are not applied to the retainer member.

The first guide surfaces of the retainer member may guide the rollers in the load-carrying races in cooperation with second guide surfaces of the carriage formed adjacent to the respective second raceway surfaces of the carriage and adapted to guide the other end surfaces of the rollers.

The linear motion guide unit may be configured such that the adjacent first guide surfaces are planar and are formed on the retainer member to extend in the longitudinal direction and to be orthogonal to each other so that the retainer member has a convex portion having a V-shaped cross section, and the convex portion is fitted into a dent-shaped locking groove which is formed in the carriage to be located between the second raceway surfaces of the carriage and extend in the longitudinal direction, whereby the retainer plate is disposed in the carriage.

The paired first guide surfaces of the retainer member may extend in the longitudinal direction and be orthogonal to each other, and the paired first guide surfaces may face and extend in parallel with the respective second guide surfaces of the carriage.

In the linear motion guide unit, the retainer member may have beak portions formed at side edge portions of the first guide surfaces, respectively, along the longitudinal direction for supporting the rollers.

In the linear motion guide unit, the frame members and the fixing member may be replaced with a frame fixing member which has frame portions functioning as the frame members and a fixing portion functioning as the fixing member, and the frame fixing member may be disposed in the recess of the retainer member.

In the linear motion guide unit, the frame fixing member may be segmented along the longitudinal direction into a plurality of segmented frame fixing members, and the segmented frame fixing members may be disposed in the recess of the retainer member.

In the linear motion guide unit, the retainer member may be formed of a synthetic resin.

Effect of the Invention

In the linear motion guide unit of the present invention, as mentioned above, in order to avoid possible deformation of the retainer member made of resin and constituting the retainer plate as a result of subjection to tightening forces of the fastening bolts, the frame members made of a metal are disposed in the retainer member at screwing positions, and the retainer plate is fixed to the carriage via the frame members. Since the tightening forces of the fastening bolts are not directly applied to the retainer member, there can be restrained deformation of the retainer member, which could otherwise result from screwing. That is, according to the present linear motion guide unit, since the tightening forces (axial forces) of the bolts are not directly applied to the retainer member, there can be restrained deformation, such as swelling, distortion, or crushing, of the retainer member, which could otherwise result from screwing; thus, the guide surfaces of the retainer member can be maintained as normal guide surfaces at all times. As a result, deformation, such as swelling, distortion, or crushing, of the guide surfaces of the retainer member of the retainer plate is prevented, so that interference between end surfaces of the rollers and the guide surfaces of the retainer member of the retainer plate can be restrained, and variations in sliding resistance can be prevented. Since the retainer member of the retainer plate is free from deformation and can be disposed with high accuracy, the retainer plate can be attached to the carriage with high accuracy, and smooth circulation of the rollers can be implemented.

BRIEF DESCRIPTION OF THE DRAWING

FIGS. 9(a) to 9(d) are views showing a frame member incorporated in the linear motion guide unit, wherein

FIGS. 12(a) and 12(b) are views showing the fixing member of the retainer plate incorporated in the linear motion guide unit, wherein

FIGS. 16(a) to 16(c) are views showing the retainer plate incorporated in the linear motion guide unit of FIG. 15, wherein

DETAILED DESCRIPTION OF THE EMBODIMENT

A linear motion guide unit according to the present invention is applicable to relative sliding members used in various types of apparatus such as machine tools, semiconductor fabrication systems, and precision measuring apparatus.

An embodiment of the linear motion guide unit according to the present invention will next be described with reference to the drawings. The members of FIG. 1 to FIGS. 12(a) and 12(b) which are identical to those of FIG. 15 and FIGS. 16(a) to 16(c) are denoted by the same reference numerals. As shown in FIGS. 1 to 4, the linear motion guide unit according to the present invention generally includes a guide rail 1 having raceway surfaces 21 (first raceway surfaces) extending in the longitudinal direction on respective longitudinal sides 23, and a slider 2 which has raceway surfaces 22 (second raceway surfaces) facing the respective raceway surfaces 21 as a result of its wing portions 65 straddling the guide rail 1 and which slides in relation to the guide rail 1 via a plurality of rolling elements, or rollers 5, rolling in load-carrying races 14 each composed of the raceway surface 21 and the raceway surface 22. The slider 2 includes a carriage 3 having a cross section resembling the reversed letter U and having return passages 15 extending in parallel with the raceway surfaces 22, end caps 4 fixedly attached to respective longitudinally opposite end surfaces 26 of the carriage 3, end seals 8 disposed on respective end surfaces of the end caps 4, the rollers 5 rolling in circulating circuits 17 each composed of the load-carrying race 14, the return passage 15, and turnaround passages 16 formed in the end caps 4 for establishing communication between the load-carrying race 14 and the return passage 15, and retainer plates 7 disposed along the respective load-carrying races 14 for retaining the rollers 5 to the slider 2. The guide rail 1 has holes 58 for allowing bolts (not shown) to be inserted therethrough in mounting the guide rail 1 on a counter member such as a base, a bed, or a machine pedestal. The carriage 3 has threaded holes 57 formed in its upper surface for attachment to a counter member such as equipment. The end cap 4 has oil supply holes 61 formed therein for supplying lubricant into the turnaround passages 16. A stopcock 62 is attached to each oil supply hole 61 for preventing leakage of lubricant from inside the end cap 4. The end caps 4, lubricant supply plates 29, and the end seals 8 are fixed to the carriage 3 with fastening bolts 60.

Figure 1:
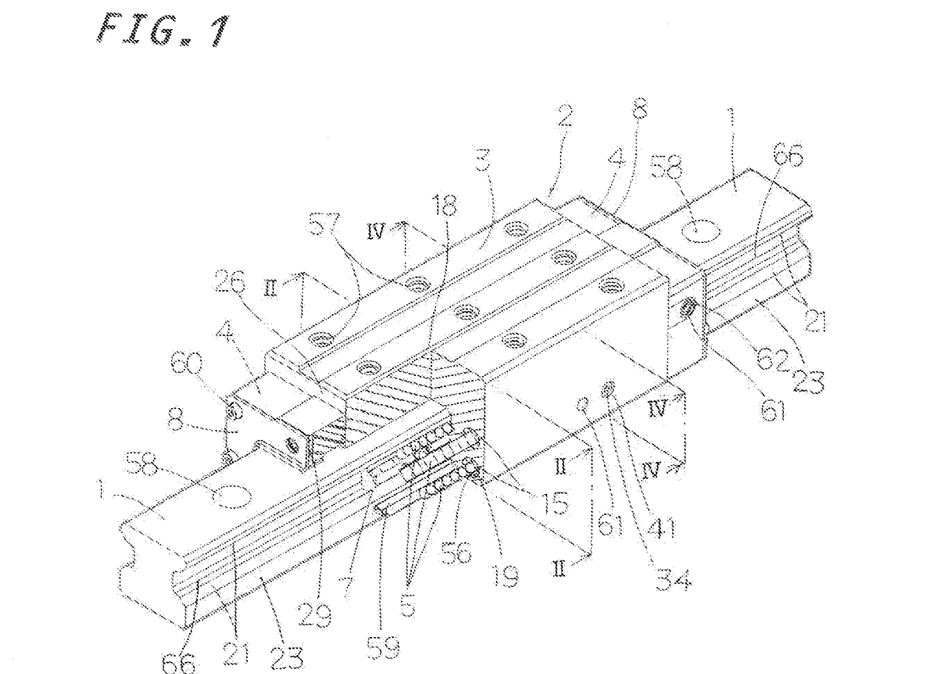
FIG. 1 is a partially cutaway sectional perspective view showing an embodiment of a linear motion guide unit according to the present invention.
Figure 2:
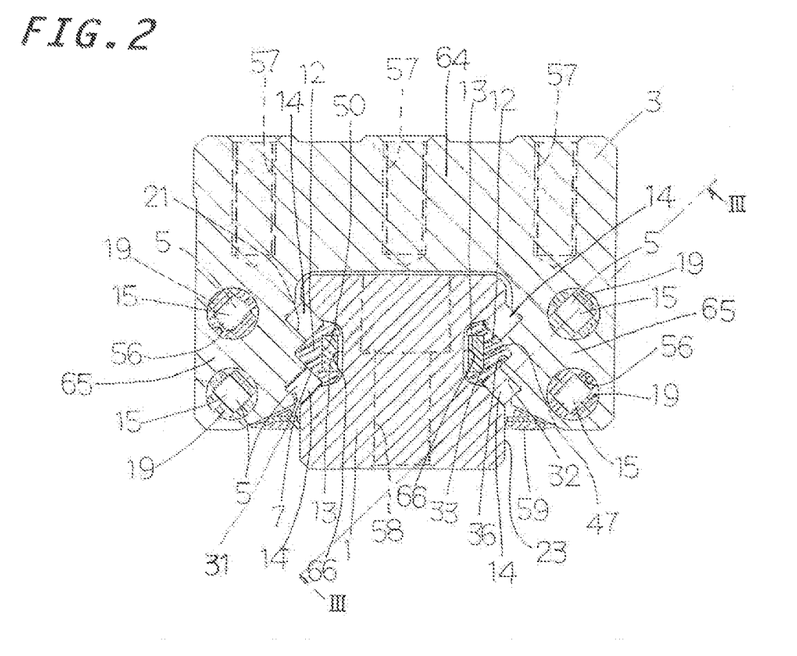
FIG. 2 is a sectional view of the linear motion guide unit taken along line II-II of FIG. 1.

As shown in FIG. 2, the linear motion guide unit of the first embodiment is of a four-race type having four load-carrying races 14. The carriage 3 includes an upper portion 64 having threaded holes 57, and a pair of wing portions 65 extending downward from the opposite ends of the central portion 64. The opposite wing portions 65 of the carriage 3 have the return passages 15 formed therein in which the rollers 5 roll under no load. The return passages 15 are formed in respective sleeves 19 inserted into respective insertion holes 56 formed in the wing portions 65 of the carriage 3. The longitudinal sides 23 of the guide rail 1 have respective clearance grooves 66 formed therein along the longitudinal direction. The wing portion 65 of the carriage 3 has a dent-shaped locking groove 36 formed therein between the upper and lower raceway surfaces 22. The wing portion 65 of the carriage 3 has guide surfaces 31 (first guide surfaces) provided in such a manner that the upper and lower raceway surfaces 22 are disposed therebetween. The retainer plate 7 for retaining the rollers 5 to the slider 2 is disposed between the longitudinal side 23 of the guide rail 1 and the wing portion 65 of the carriage 3. The retainer plate 7 has adjacent planar guide surfaces 32 (second guide surfaces) which extend in the longitudinal direction and are orthogonal to each other so that the retainer plate 7 has a convex portion having a V-shaped cross section and a flat top 47. The retainer plate 7 is disposed in the carriage 3 with the top 47 of the retainer plate 7 fitted into the dent-shaped locking groove 36 of the carriage 3. The guide surfaces 32 of the retainer plate 7 guide one end surfaces 25 of the rollers 5, and the guide surfaces 31 of the carriage 3 guide the other end surfaces 25 of the rollers 5. Lower seals 59 are disposed respectively between the lower surfaces of the wing portions 65 and the guide rail 1. The end cap 4 includes an end cap body 6 having the outer circumferential surfaces of the turnaround passages 16 formed therein, and a spacer 9 (FIG. 3) fitted in a recess formed in the carriage-side end surface thereof.

Figure 3:
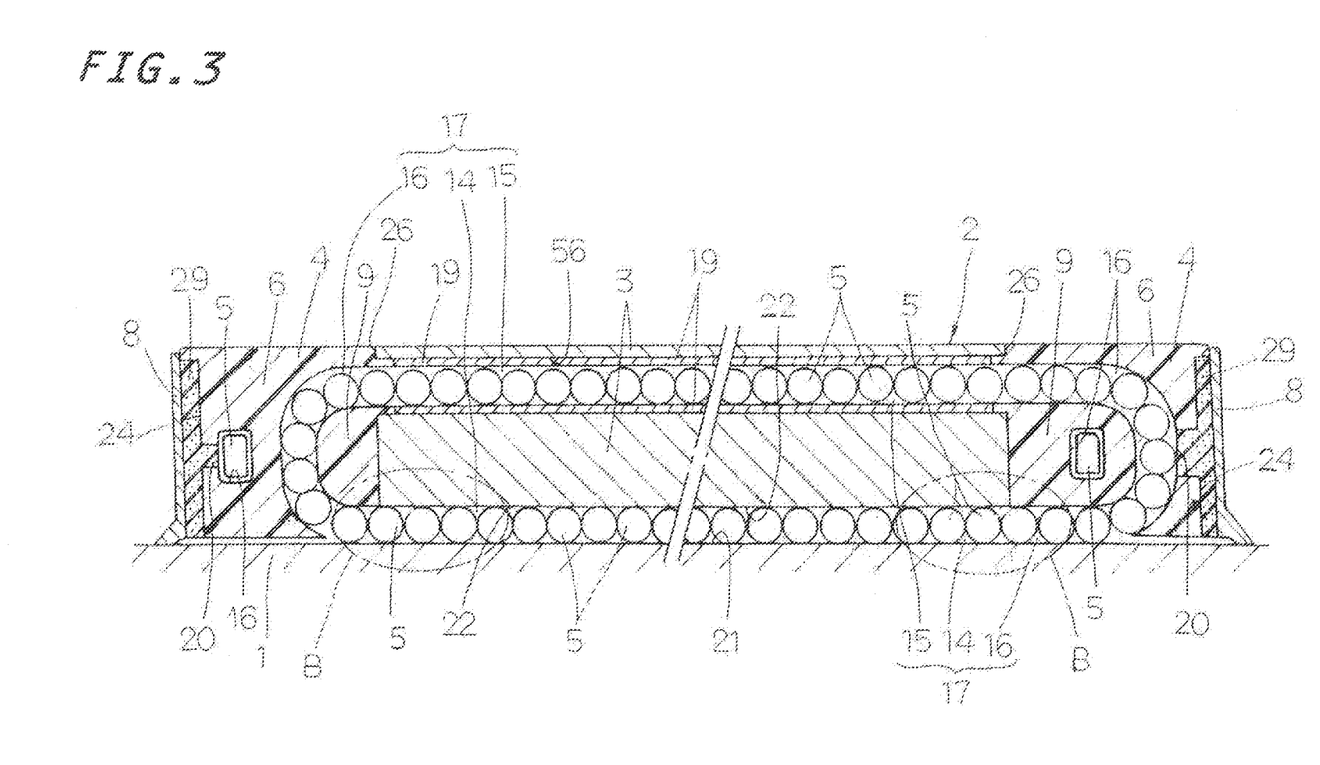
FIG. 3 is a sectional view taken along line III-III of FIG. 2, showing a circulating circuit in which rolling elements, or rollers, roll.

FIG. 3 shows the circulating circuit 17 in which the rolling elements, or the rollers 5, roll in an endlessly circulating manner. The circulating circuit 17 is composed of the load-carrying race 14 formed between the raceway surface 21 of the guide rail 1 and the raceway surface 22 of the carriage 3, the return passage 15 provided in the carriage 3, and the turnaround passages 16 provided in the end caps 4. The end cap body 6 has the lubricant supply plate 29, or a lubricant-impregnated member, fitted in a concave portion 24 formed in the end-seal-8-side end surface thereof. Protrusions of the lubricant supply plate 29, or a lubrication plate, are exposed to the respective turnaround passages 16 from openings 20 formed in the outer end surface of the end cap body 6. The rollers 5 rolling in the turnaround passages 16 come into contact with the protrusions to thereby be supplied with lubricant. The lubricant supply plate 29 is formed of, for example, a sintered porous resin. Such a sintered porous resin is formed as follows: a compacted body of ultra-high-molecular-weight synthetic resin particles is heated so as to yield a sintered resin having a porous structure in which communicating spaces are formed among the synthetic resin particles. The pores are impregnated with lubricant.

Figure 4:
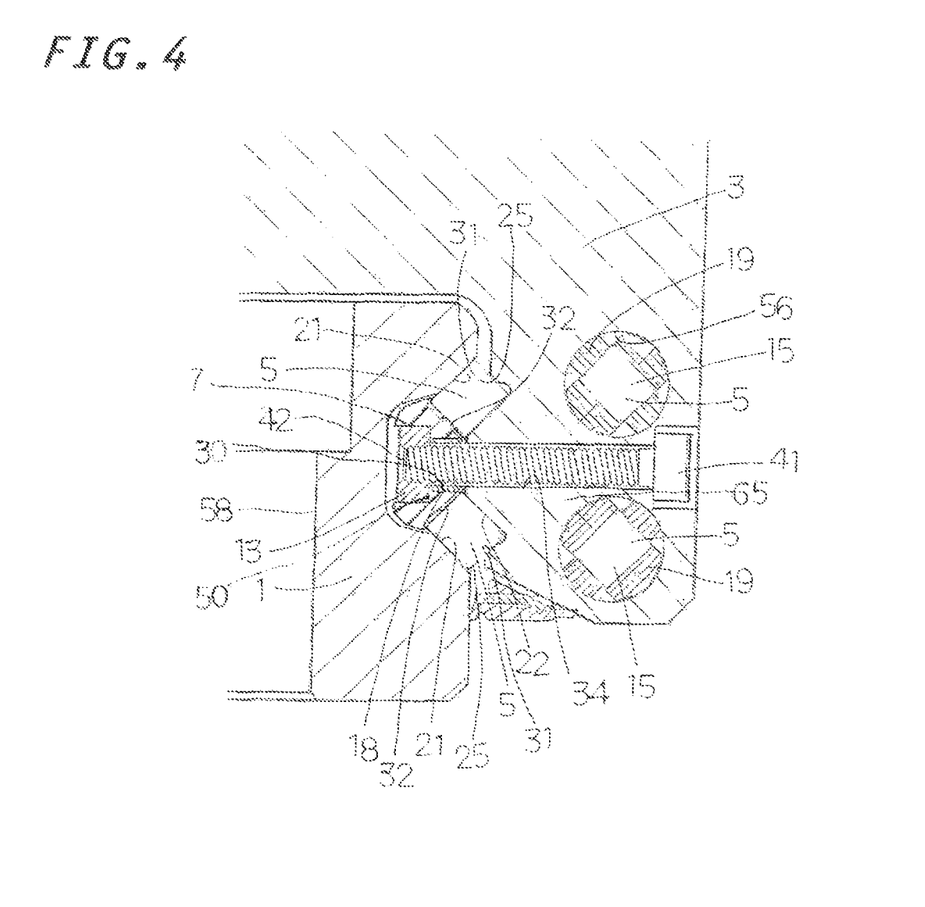
FIG. 4 is a sectional view taken along line IV-IV of FIG. 1, partially showing the state of fixing a retainer plate to a carriage with a fastening bolt.

In the present linear motion guide unit, as shown in FIGS. 2 and 4, the top 47 of the convex portion having a V-shaped cross section of the retainer plate 7 is formed between the upper and lower guide surfaces 32 of the retainer plate 7 and extends in the longitudinal direction. As shown in FIG. 2, the top 47 of the retainer plate 7 is fitted into the dent-shaped locking groove 36 which has a V-shaped cross section, is formed between the upper and lower raceway surfaces 22 of the carriage 3, and extends in the longitudinal direction. Fastening bolts 41 are inserted through respective holes 34 of the carriage 3 and screwed into respective female threads 42 formed in the fixing member 13 of the retainer plate 7, whereby the retainer plate 7 is fixed to the carriage 3.

Figure 5:
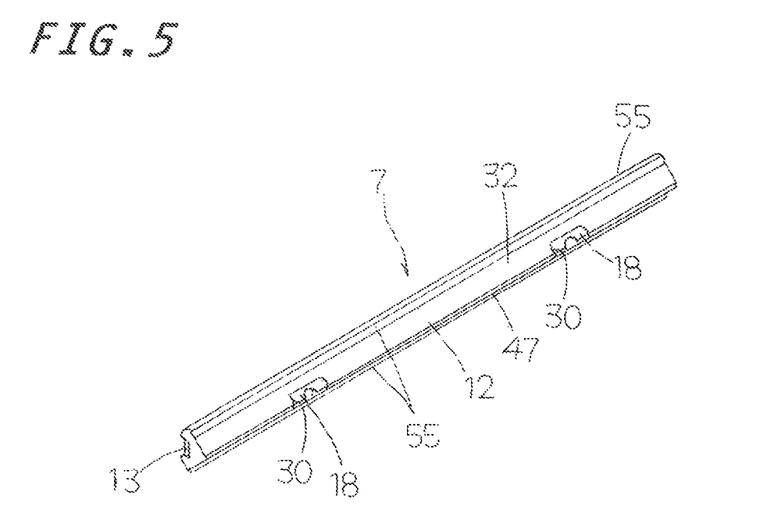
FIG. 5 is a perspective view showing an embodiment of the retainer plate of FIG. 1.
Figure 6:
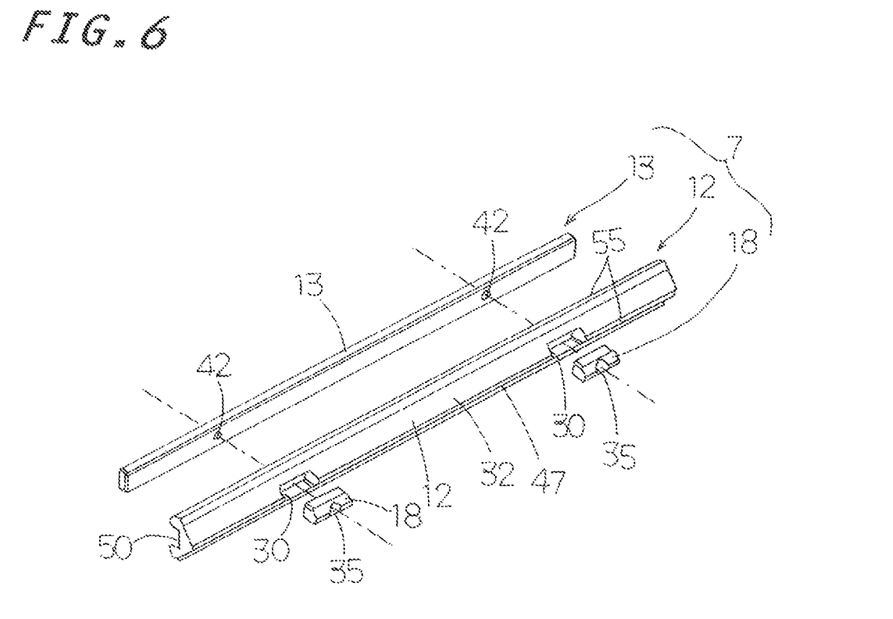
FIG. 6 is an exploded perspective view of the retainer plate of FIG. 5 disassembled into a retainer member, a fixing member, and frame members.
Figure 7:
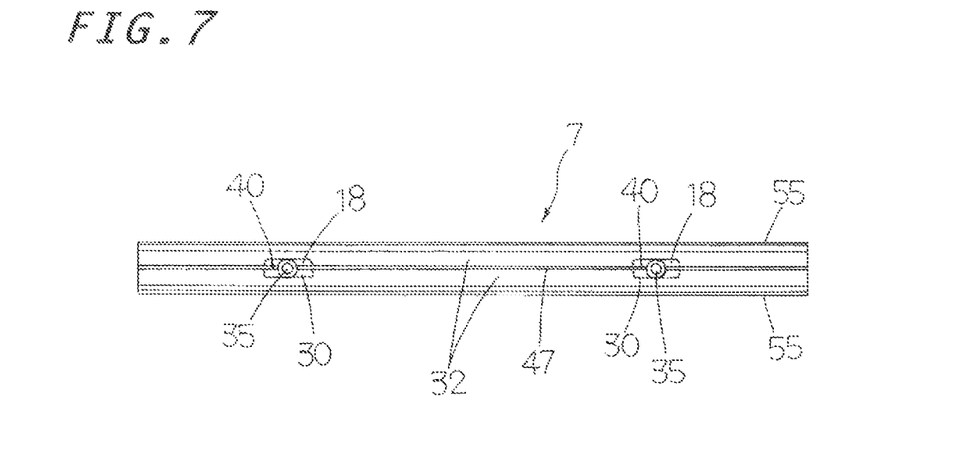
FIG. 7 is a side view showing the retainer member and the frame members of the retainer plate of FIG. 5.
Figure 8:
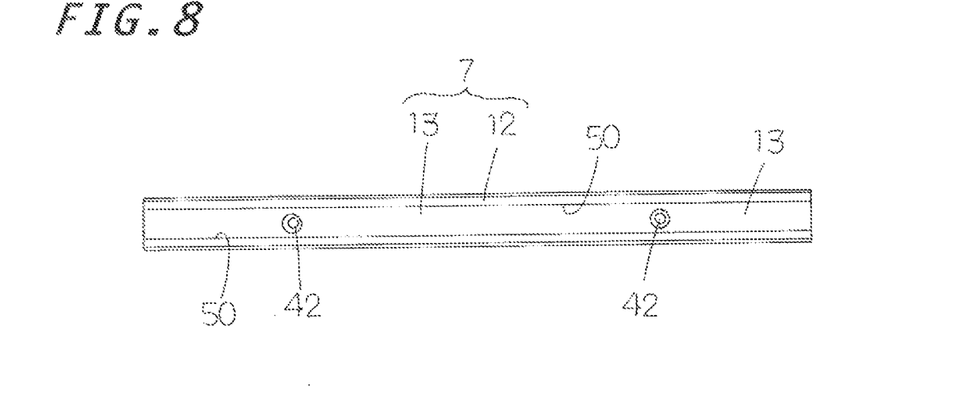
FIG. 8 is a rear view showing the retainer member of FIG. 7.
Figure 9A:
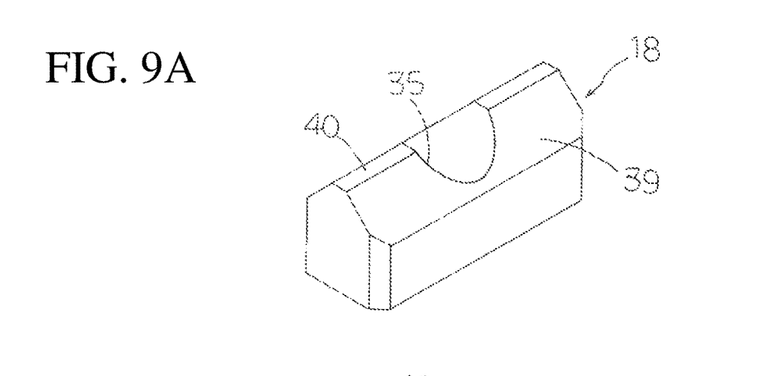
FIG. 9(a) is a perspective view of the frame member.
Figure 9B:
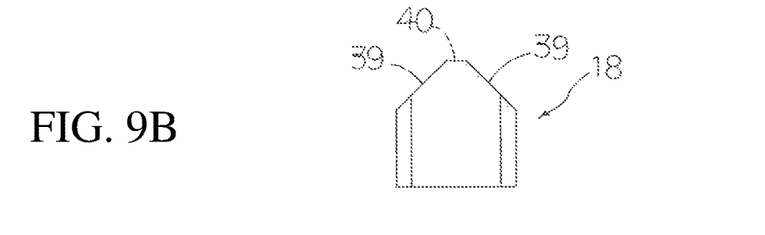
FIG. 9(b) is a front view of the frame member of FIG. 9(a)
Figure 9C:
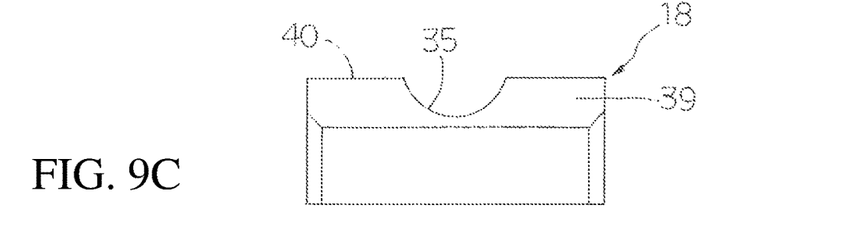
FIG. 9(c) is a side view of the frame member of FIG. 9(a)
Figure 9D:
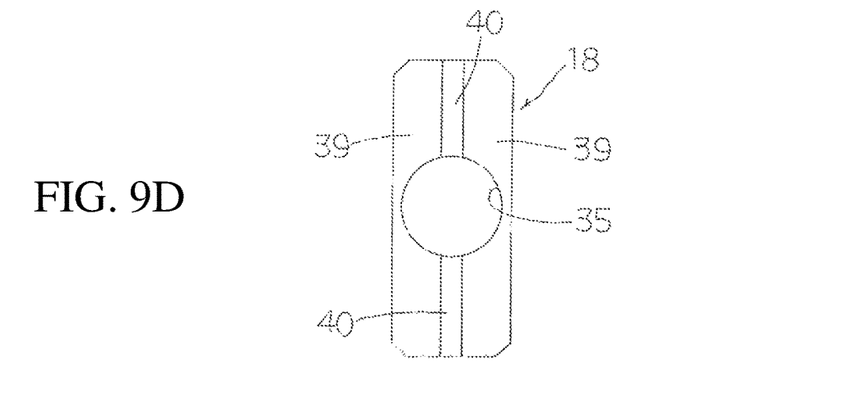
FIG. 9(d) is a plan view of the frame member of FIG. 9(a)

The linear motion guide unit according to the present invention is characterized, particularly, by the retainer plate 7 for retaining the rollers 5 to the slider 2. As shown in FIGS. 5 and 6, the retainer plate 7 is composed primarily of a retainer member 12 made of a synthetic resin, extending in the longitudinal direction, and having a pair of the guide surfaces 32 for guiding one end surfaces 25 of the rollers 5; the fixing member 13 made of a metal, fitted in a recess 50 formed in the retainer member 12 on a back side of the guide surfaces 32 and extending in the longitudinal direction, and adapted to fix the retainer member 12 to the carriage 3; and frame members 18 made of a metal, disposed in respective through holes 30 (first through holes) extending through the retainer member 12 and located at predetermined longitudinal positions, and adapted to form a predetermined gap between the fixing member 13 and the carriage 3. The retainer member 12 of the retainer plate 7 has the recess 50 formed at the back thereof along the full length thereof for receiving the fixing member 13. As shown in FIG. 6, the fixing member 13 made of a metal and having female threads 42 formed therein is disposed at the back of the retainer member 12 of the retainer plate 7. As shown in FIG. 4, the wing portion 65 of the carriage 3 has the holes 34 formed therein; the retainer member 12 has a plurality of (two in the present embodiment) through holes 30 formed therein at predetermined intervals; and the frame members 18 are fitted in the respective through holes 30. The fixing member 13 has the female threads 42 formed therein at positions facing the holes 34 of the carriage 3 and located at longitudinal intervals.

FIGS. 9(a) to 9(d) show the frame member 18 of the retainer plate 7. The frame members 18 are fitted into the respective through holes 30 of the retainer member 12 so as to prevent deformation of the retainer member 12. Each frame member 18 has a through hole 35 (second through hole) through which the fastening bolt 41 is inserted, and inclined surfaces 39 of a convex portion having V-shaped cross section corresponding to that of the retainer member 12. The frame member 18 has a flat top 40 at which the inclined surfaces 39 of the convex portion having V-shaped cross section meet. In other words, the inclined surfaces 39 of the frame member 18 correspond to the guide surfaces 32 of the retainer member 12, and the top 40 of the frame member 18 corresponds to the top 47 of the retainer member 12 at which the guide surfaces 32 of the retainer member 12 meet. The frame member 18 has the through hole 35 through which the fastening bolt 41 for fixing the fixing member 13 to the carriage 3 is inserted. The fastening bolts 41 are inserted through the holes 34 formed in the carriage 3 and through the through holes 35 formed in the frame members 18 and are screwed into the respective female threads 42 of the fixing member 13 to thereby fix the retainer plate 7 to the carriage 3. The guide surfaces 32 formed on the retainer member 12 guide the rollers 5 in the load-carrying races 14 in cooperation with the guide surfaces 31 adapted to guide the other end surfaces 25 of the rollers 5 and extending adjacently to the respective raceway surfaces 22 of the carriage 3. In the present linear motion guide unit, the fastening bolts 41 are inserted through the respective holes 34 formed in the carriage 3 and through the respective through holes 35 of the frame members 18 and are threadingly engaged with the respective female threads 42 of the fixing member 13 so as to fasten the fixing member 13 to the carriage 3, whereby the frame members 18 come into contact with the fixing member 13 and with the carriage 3 to thereby form a predetermined gap between the fixing member 13 and the carriage 3, so that the retainer plate 7 is fixed to the carriage 3 in a state in which tightening forces of the fastening bolts 41 are not applied to the retainer member 12. At this time, since the frame members 18 made of a metal are fitted into the respective through holes 30 formed in the retainer member 12, tightening forces of the fastening bolts 41 are not applied to the retainer member 12; i.e., direct imposition of the tightening forces (axial forces) of the fastening bolts 41 on the retainer member 12 can be avoided. Therefore, deformation of the retainer member 12 which could otherwise result from application of the tightening forces is avoided, so that a state of rolling of the rollers 5 is not adversely affected; accordingly, the rollers 5 can smoothly roll in the load-carrying races 14. Preferably, the frame members 18 are formed such that the contact surfaces between the frame members 18 and the fixing member 13 are flush with the contact surface between the retainer member 12 and the fixing member 13.

Figure 10:
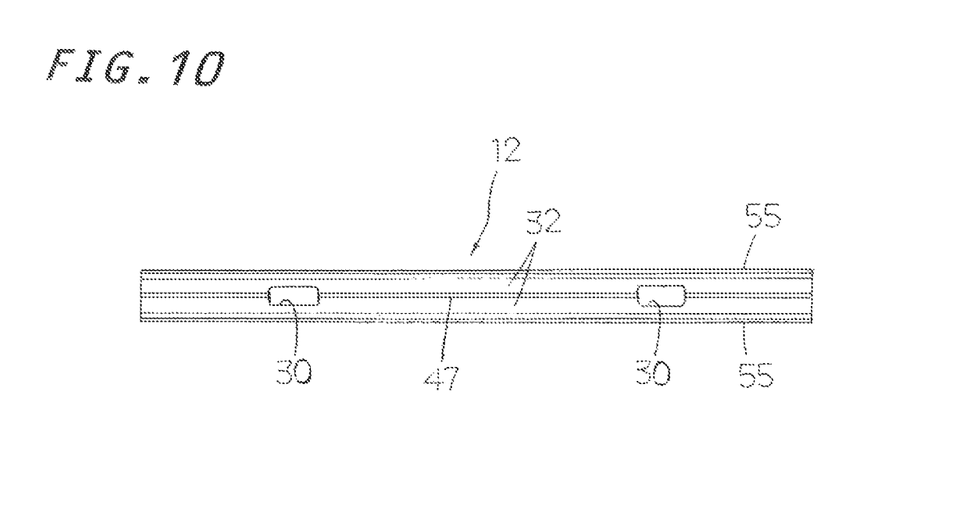
FIG. 10 is a side view of the retainer member of FIG. 6.
Figure 11:
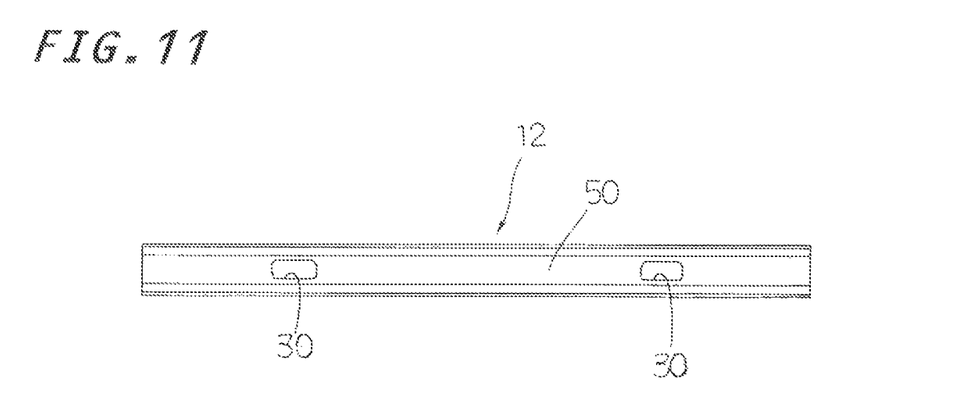
FIG. 11 is a rear view of the retainer member of FIG. 10.
Figure 12A:
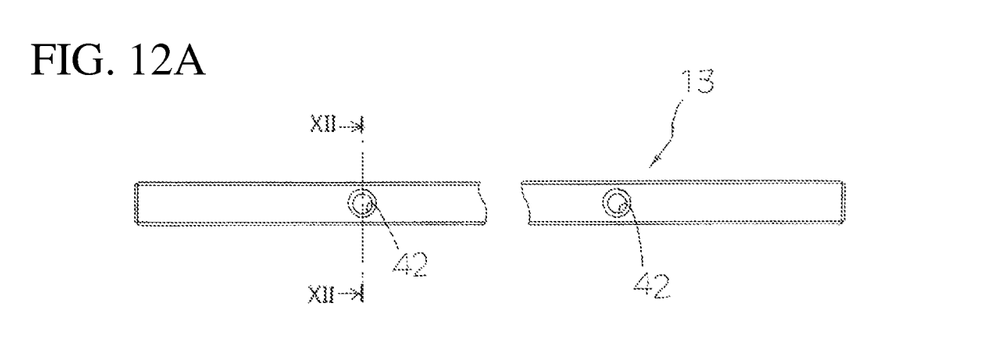
FIG. 12(a) is a side view of the fixing member of FIG. 6
Figure 12B:
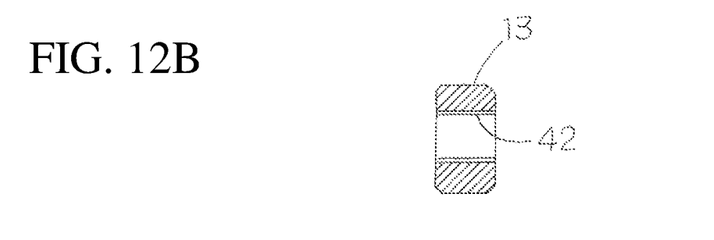
FIG. 12(b) is a sectional view taken along line XII-XII of FIG. 12(a)

The retainer member 12 of the retainer plate 7 is formed of engineering plastic such as POM (polyacetal). As shown in FIGS. 10 and 11, the retainer member 12 has beak portions 55 formed along the longitudinal direction at side edges of the respective guide surfaces 32 extending in the longitudinal direction, for supporting edge portions of rolling surfaces of the rollers 5 so as to retain the rollers 5. The guide surfaces 32 of the retainer member 12 are planar and inclined such that a cross section of the retainer member 12 orthogonal to the longitudinal direction has a convex shape. The fixing member 13 has a plurality of the female threads 42 formed therein at predetermined positions located at longitudinal intervals; the retainer plate 7 and the carriage 3 have the through holes 30 and the holes (through holes) 34 formed therein respectively at positions corresponding to the female threads 42; and the fastening bolts 41 are inserted through the respective holes 34 from outside the carriage 3 and are threadingly engaged with the respective female threads 42 of the fixing member 13 to thereby fix the retainer plate 7 to the carriage 3. At this time, since the retainer member 12 is fixed to the carriage 3 through the frame members 18 made of a metal, direct imposition of tightening forces of the fastening bolts 41 on the retainer member 12 can be avoided, and thus deformation of the retainer member 12 can be restrained. Also, in the present linear motion guide unit, the adjacent planar guide surfaces 32 are formed on the retainer member 12 to extend in the longitudinal direction and be orthogonal to each other so that the retainer member 12 has a convex portion having a V-shaped cross section and the top 47. The retainer plate 7 is disposed in the carriage 3 with the top 47 of the retainer plate 7 fitted into the dent-shaped locking groove 36 which is formed between the raceway surfaces 32 of the carriage 3 and extends in the longitudinal direction. The paired guide surfaces 32 of the retainer member 12 extend in the longitudinal direction and are orthogonal to each other, and the paired guide surfaces 32 face and extend in parallel with the respective guide surfaces 31 of the carriage 3.

The above embodiment of the linear motion guide unit according to the present invention is described while referring to the retainer plate 7 in which two frame members 18 are disposed in the retainer member 12 at longitudinal intervals. However, the number of the frame members 18 disposed at longitudinal intervals is not limited to two, but may be determined as appropriate according to the length of the retainer member 12; i.e., one frame member 18 or a plurality of, such as three or four, frame members 18 can be provided according to the length of the retainer plate 7. In such a case, the number of the through holes 30 formed in the retainer plate 7 and the number of the female threads 42 formed in the fixing member 13 may be determined so as to be equal to the number of the frame members 18.

Figure 13:
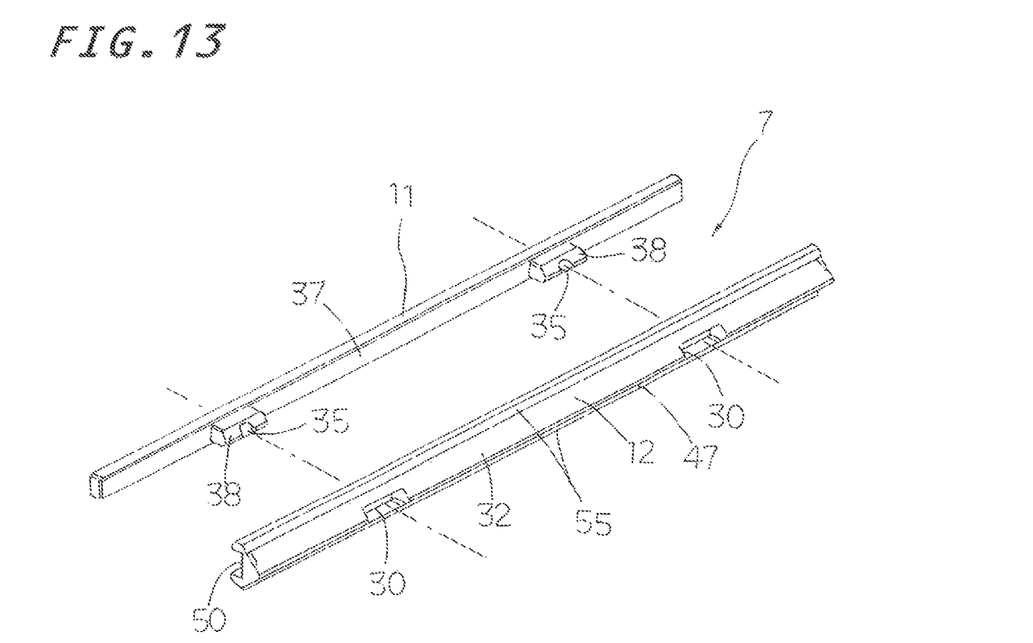
FIG. 13 is an exploded perspective view showing another embodiment of the retainer plate of FIG. 1.

Next, with reference to FIG. 13, a second embodiment of the retainer plate 7 will be described. In contrast to the above first embodiment, the second embodiment of the retainer plate 7 in the present linear motion guide unit is composed of a frame fixing member 11 formed by integrating the frame members 18 and the fixing member 13, and the retainer member 12 having the guide surfaces 32 for retaining and guiding the rollers 5. The frame fixing member 11 has frame portions 38 functioning as the frame members 18 of the above first embodiment, and a fixing portion 37 functioning as the fixing member 13. According to the second embodiment, since the frame members 18 and the fixing member 13 are integrated, in an assembling step, a failure to attach the frame members 18 does not occur, and assembling work is easy and simple. Also, according to the second embodiment, the frame fixing member 11 to be assembled to the retainer member 12 has a structure in which the fixing portion 37 has two frame portions 38 located at longitudinal intervals. However, the number of the frame portions 38 may be determined as appropriate according to the length of the fixing portion 37.

Figure 14:
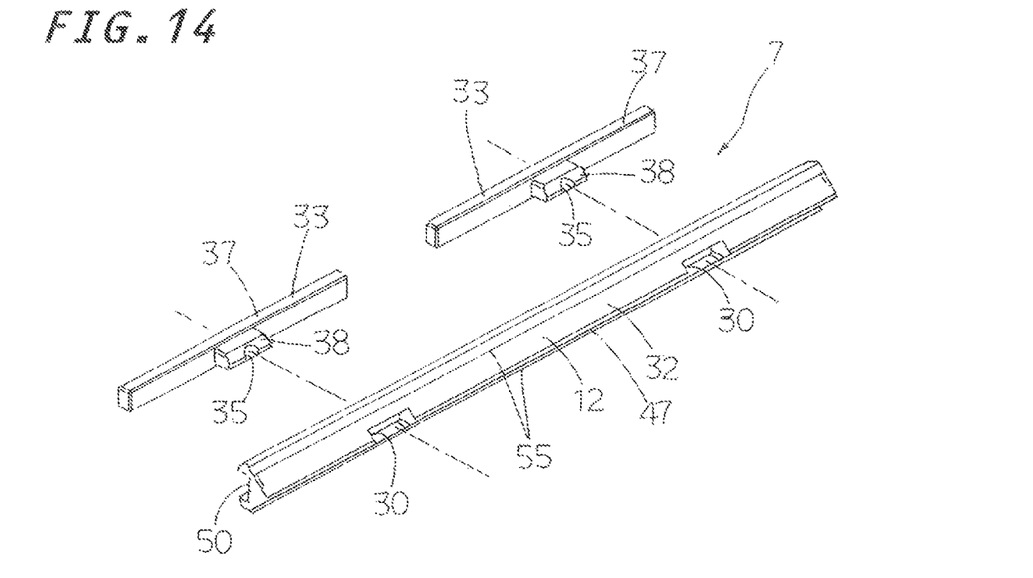
FIG. 14 is an exploded perspective view showing a still another embodiment of the retainer plate of FIG. 1.
Figure 15:
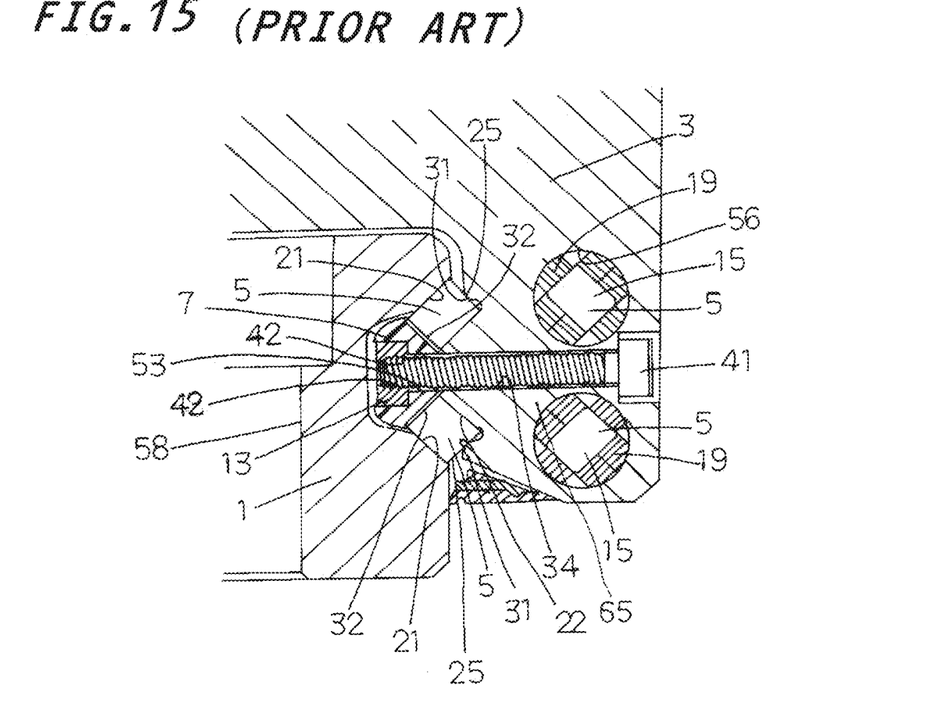
FIG. 15 is a sectional view showing a region, corresponding to that of FIG. 4, of a conventional linear motion guide unit, partially showing the state of fixing a retainer plate to a carriage with a fastening bolt.
Figure 16A:
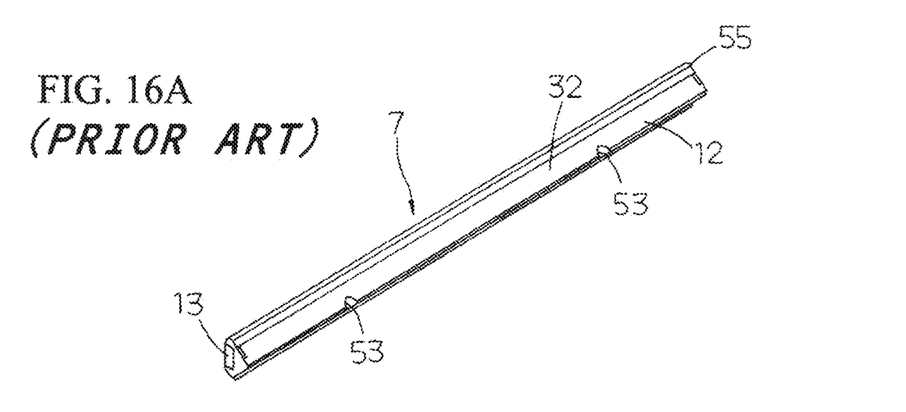
FIG. 16(a) is a perspective view of the retainer plate.
Figure 16B:
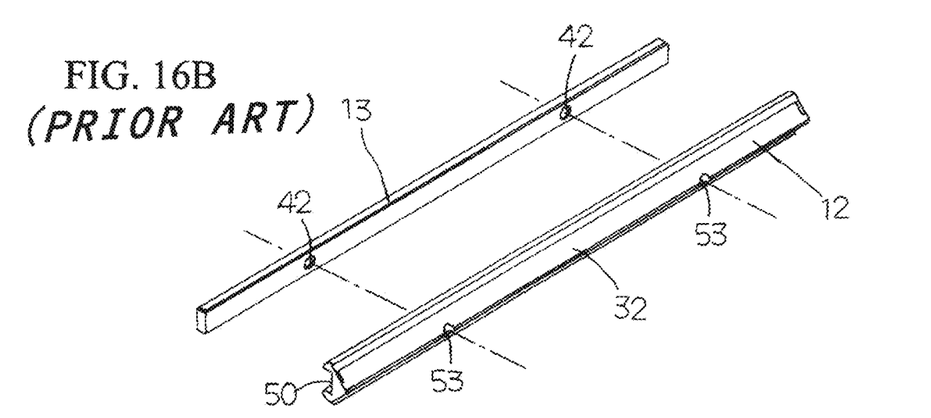
FIG. 16(b) is an exploded perspective view of the retainer plate disassembled into a retainer member and a fixing member.
Figure 16C:
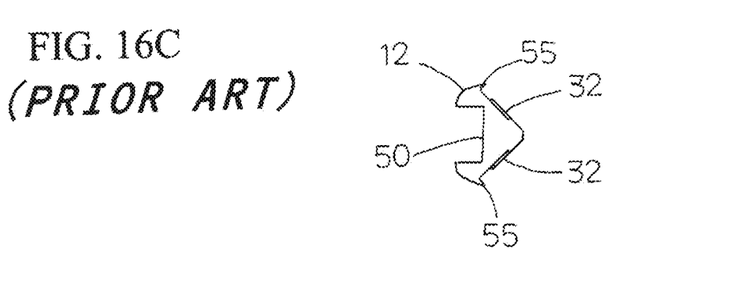
FIG. 16(c) is a front view of the retainer member as viewed from an end surface thereof.

Further, with reference to FIG. 14, a third embodiment of the retainer plate 7 will be described. As shown in FIG. 14, in contrast to the second embodiment in which the frame portions 38 and the fixing portion 37 are integrated into the frame fixing member 11, according to the third embodiment of the retainer plate 7 in the present linear motion guide unit, the frame fixing member 11 is segmented into two segmented frame fixing members 33. The number of the segmented frame fixing members 33 is not limited to two, but may be determined as appropriate. Further, the number of frame portions 38 of the segmented frame fixing member 33 is not limited to one, but may be determined as appropriate.

What is claimed is:

1. A linear motion guide unit comprising:
    a guide rail having first raceway surfaces extending in a longitudinal direction on respective opposite longitudinal sides, and a slider which straddles the guide rail, has second raceway surfaces facing the respective first raceway surfaces, and slides in relation to the guide rail via rolling elements serving as rollers and rolling in load-carrying races formed between the first raceway surfaces and the second raceway surfaces, respectively,
    wherein the slider has a carriage which has the second raceway surfaces, and return passages extending in parallel with the second raceway surfaces, end caps disposed on respective longitudinally opposite end surfaces of the carriage and having turnaround passages formed therein for establishing communication between the load-carrying races and the return passages, the rollers rolling in circulating circuits composed respectively of the load-carrying races, the return passages, and the turnaround passages, and retainer plates disposed along the respective second raceway surfaces and adapted to retain the rollers to the slider;
    the retainer plate comprises a retainer member extending in the longitudinal direction and having a pair of first guide surfaces for guiding one end surface of each of the rollers, a fixing member made of a metal, disposed in a recess formed in the retainer member on a back side of the first guide surfaces and extending in the longitudinal direction, and adapted to fix the retainer member to the carriage, and frame members made of a metal, disposed in first through holes extending through the retainer member and located at predetermined longitudinal positions, and adapted to form a predetermined gap between the fixing member and the carriage:
    each of the frame members has a second through hole formed therein and allowing insertion therethrough of a fastening bolt for fixing the fixing member to the carriage, and the fixing member has female threads formed at longitudinal intervals and threadingly engaged with the respective fastening bolts; and
    the fastening bolts are inserted through respective holes formed in the carriage and through the respective second through holes of the frame members and are threadingly engaged with the respective female threads of the fixing member so as to fasten the fixing member to the carriage, whereby the frame members come into contact with the fixing member and with the carriage to thereby form the predetermined gap between the fixing member and the carriage, so that the retainer plate is fixed to the carriage in a state in which tightening forces of the fastening bolts are not applied to the retainer member.

2. A linear motion guide unit according to claim 1, wherein the first guide surfaces of the retainer member guide the rollers in the load-carrying races in cooperation with second guide surfaces of the carriage formed adjacent to the respective second raceway surfaces of the carriage and adapted to guide the other end surface of each of the rollers.

3. A linear motion guide unit according to claim 1, wherein the adjacent first guide surfaces are planar and are formed on the retainer member to extend in the longitudinal direction and to be orthogonal to each other so that the retainer member has a convex portion having a V-shaped cross section, and the convex portion is fitted into a dent-shaped locking groove which is formed in the carriage to be located between the second raceway surfaces of the carriage and extend in the longitudinal direction, whereby the retainer plate is disposed in the carriage.

4. A linear motion guide unit according to claim 1, wherein the paired first guide surfaces of the retainer member extend in the longitudinal direction and are orthogonal to each other, and the paired first guide surfaces face and extend in parallel with the respective second guide surfaces of the carriage.

5. A linear motion guide unit according to claim 1, wherein the retainer member has beak portions formed at side edge portions of the first guide surfaces, respectively, along the longitudinal direction for supporting the rollers.

6. A linear motion guide unit according to claim 1, wherein the retainer member is formed of a synthetic resin.

* * * * *